United States Patent Office 2,888,771
Patented June 2, 1959

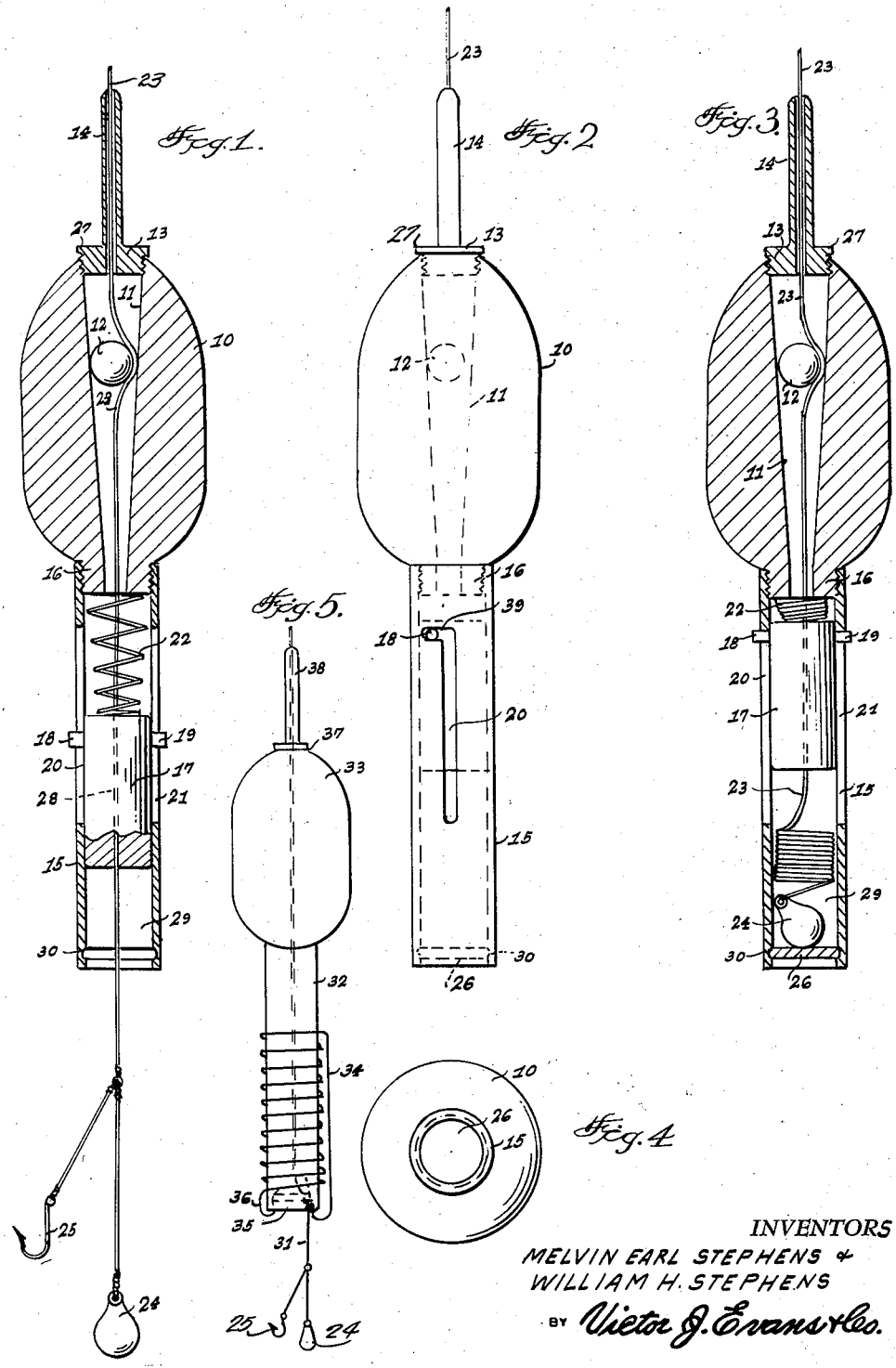

2,888,771

FISHERMAN'S CASTING FLOAT

Melvin Earl Stephens and William H. Stephens, Orlando, Fla.

Application December 18, 1957, Serial No. 703,563

3 Claims. (Cl. 43—41.2)

This invention relates to a casting float or bobber in which the float is adjustably mounted by a ball clutch on a fishing line, and in particular a float, with a ball in a tapered opening in the upper end, and provided with a chamber depending from the lower end with a spring loaded plunger for ejecting part of the fishing line, with a hook and sinker thereon, from the lower end of the chamber in which the fishing line, hook, and sinker are retained by a water soluble material.

The purpose of this invention is to provide a float or bobber for a fishing line in which the part of the line beyond the float with a hook and sinker is retained in the float by water soluble material while casting and is not released until the float is positioned in the water.

In making a long cast or in casting a fishing line where there is interference such as branches of trees, bushes, and the like a hook dangling from a bobber or float is often caught in a branch of a tree or bush resulting in the necessity of making another cast and, in some instances losing the hook, sinker and float. With this thought in mind this invention contemplates a float or bobber in which a portion of the line, a hook, and the sinker are retained by a water soluble material in a tubular chamber depending from the float until the float arrives at its destination on the water and at which time the material is dissolved by the water and the hook and sinker are released, dropping downwardly from the float.

The object of this invention is, therefore, to provide means for retaining a hook, portion of a line, and sinker in a float or bobber until the device arrives at its destination in the water.

Another object of the invention is to provide a float or bobber for fishing lines in which upon the dissolving of a water soluble material in the water, a portion of a fishing line, hook and sinker are ejected from a float by a spring loaded plunger.

A further object of the invention is to provide a bobber for fishing lines in which a portion of a line, a sinker and a hook are retained in the bobber while casting, in which the device is of a simple and economical construction.

With these and other objects and advantages in view the invention embodies a body of cork or other buoyant material having a tapering bore extended vertically therethrough with a cap having an opening therethrough threaded on the upper end and with a tube having a spring loaded plunger, a portion of a fishing line, a hook, and a sinker retained therein by water soluble material, depending from the lower end.

Other features and advantages of the invention will appear from the following description taken in connection with the drawing, wherein:

Figure 1 is a vertical section through the improved float or bobber with the parts shown in released or fishing position.

Figure 2 is a side elevational view of the improved float or bobber in which the parts are retained in the bobber by a water soluble material.

Figure 3 is a vertical section through the float or bobber showing the parts assembled and retained in a tubular chamber depending from the body of the bobber by a water soluble material.

Figure 4 is a view looking upwardly toward the lower end of the bobber showing the device with the parts assembled therein.

Figure 5 is a view showing a modification wherein the portion of the line beyond the float or bobber is wrapped around the tubular chamber depending from the body of the float and also showing the end of the line retained in the tubular chamber by a water soluble capsule or plug.

Referring now to the drawing wherein like reference characters denote corresponding parts the improved fishing float or bobber of this invention includes a body 10 of cork or the like, having a tapering opening 11, in which a ball 12 is positioned, extended longitudinally therethrough and having a cap 13 with an extended neck 14 threaded in the upper end of the body, a tube 15 threaded on a boss 16 extended from the lower end of the body, a plunger 17 slidably mounted in the tube 15 and retained in position by ears 18 and 19 which extend through slots 20 and 21 respectively in the sides of the tube, and a spring 22 positioned above the plunger in the upper end of the tube and used to drive the plunger downwardly to eject a fishing line 23, sinker 24, and a hook 25 as a water soluble element 26 in the end of the tube disintegrates.

The ball 12 in the tapering opening 11 extended longitudinally through the body 10 provides a clutch locking the fishing line in the float or bobber preventing downward movement of the line and permitting the line to be drawn upwardly through the float or bobber.

The fishing line extends through the neck 14 of the cap 13 threaded in the upper end of the body 10 and the cap is provided with a knurled flange 27 by which the cap may be rotated with the thumb and forefinger of a hand to insert or remove the cap.

The fishing line extends through the threaded boss 16 on the lower end of the body 10 and also through a passage 28 in the plunger 17 and, with the parts in casting positions a portion of the line with the hook and sinker thereon is retained in a cavity 29 in the lower part of the tube 15 by water soluble material in the cavity or by a disc 26 of water soluble material, the periphery of which may extend into an inner annular groove 30 in the lower end of the tube. Instead of being wrapped in the tube, as shown in Figure 3, the fishing line may be wrapped around the tube, as shown in Figure 5 in which the fishing line, which is indicated by the numeral 31 is wrapped around a tube 32 depending from a bobber 33, the line, hook, and sinker being retained in position on the lower end of the tube by water soluble elements 34 and 35, the element 35 being retained in position by clips 36. In this design the upper end of the body or float is provided with a cap 37 having a neck 38 similar to the cap 13 and neck 14 of the design shown in Figures 1, 2, and 3.

The upper ends of the slots 20 and 21 of the tube 15 are provided with offset sections 39 in which the pins or ears 18 and 19 are positioned with the plunger cocked and by this means the plunger is retained in the upper position shown in Figure 3 in transit or as a fisherman is traveling from home to the water. Just before casting the ears 18 and 19 are turned wherein they are positioned in upper ends of the slots 20 and 21 so that upon release of the plunger by the water soluble capsule or material dissolving the plunger is actuated by the spring 22 to eject the portion of the fishing line in the lower end of the tube and the hook and sinker.

With the parts assembled, as illustrated in Figure 3, the cast is made wherein the bobber or float provides a projectile drawing the line through the air and with the hook and sinker contained in the bobber or float the bobber is free to pass through small interference, such as branches or leaves and at the same time the weight thereof carries the line to a desired fishing position. Upon arriving at the desired position the bobber drops into the water and the water soluble material dissolves or disintegrates with the plunger 17 ejecting the fishing line, hook and sinker whereby the hook and sinker or lure drop to fishing positions.

It will be understood that modifications, within the scope of the appended claims, may be made in the design and arrangement of the parts without departing from the spirit of the invention.

What is claimed is:

1. In a fishing line bobber, the combination which comprises a line, a hook, a sinker, a body having a tapering opening extended longitudinally therethrough with the larger end of the opening extended upwardly, the body being of bouyant material, a cap on the upper end of the body, the cap having a fishing line passage extended therethrough, a ball in the tapering opening of the body for preventing outward movement of a fishing line extended through the body except with the body in an inverted position, a tube having sidewalls which depend from the body, said sidewalls having longitudinal slots formed therein the slots being positioned intermediate of the ends of the tube, a plunger received in said tube, said plunger having ears thereon which extend into the slots slidably mounted in the tube, a spring in the tube positioned between the upper ends of the plunger and body for urging the plunger outwardly of the tube, said plunger being of such a length that in the release position thereof its lower end projects to a point adjacent the lower end of the tube and a member of water soluble material in the extended end of the tube for retaining the portion of the fishing line, the hook, and the sinker in said tube against the action of the spring biased plunger.

2. In a fishing line bobber, the combination which comprises a line, a hook, a sinker, a body having a tapering opening extended longitudinally therethrough with the larger end of the opening extended upwardly, the body being of bouyant material, a cap on the upper end of the body, the cap having a fishing line passage extended therethrough, a ball in the tapering opening of the body for preventing outward movement of a fishing line extended through the body except with the body in an inverted position, a tube having sidewalls which depend from the body, said sidewalls having longitudinal slots formed therein and intermediate of the ends, a plunger received in said tube, said plunger having ears thereon which extend into the slots slidably mounted in the tube, said plunger being of such a length that the released position thereof, its lower end projects to a point adjacent the lower end of the tube, a spring in the tube positioned between the plunger and body for urging the plunger outwardly of the tube, a member of water soluble material in the extended end of the tube for retaining a portion of a fishing line, a hook, and a sinker in said tube, and means for retaining the plunger in the cocked position against the action of the spring biased plunger.

3. In a float for fishing lines, the combination which comprises a line, a hook, a sinker, an elongated cork body having a tapering opening extended longitudinally therethrough, the opening being positioned with the large end extended upwardly, a cap having an elongated neck extended upwardly therefrom threaded in the upper end of the body, the cap and neck having a fishing line receiving passage extended therethrough, a ball in the tapering opening of the body providing a lock for securing the fishing line in position, a tube depending from the lower end of the body, said tube having elongated slots formed therein intermediate the ends thereof with offset sections at the upper ends thereof in its walls, a plunger received in said tube, said plunger having pins thereon, which extend into the slots and positioned to extend into the offset sections thereof for retaining the plunger in a cocked position, a spring positioned in said tube, said plunger being of such a length that in the released position thereof, its lower end projects to a point adjacent the lower end of the tube between the upper end of the plunger and body, and a member of water soluble material in the lower end of the tube for retaining the portion of the fishing line, the hook, and the sinker in the lower part of the tube against the action of the spring biased plunger.

References Cited in the file of this patent

UNITED STATES PATENTS

| 717,237 | Marsters | Dec. 30, 1902 |
| 1,344,176 | Cressler | June 22, 1920 |
| 2,190,531 | Kaboskey | Feb. 13, 1940 |

FOREIGN PATENTS

| 20,443 | Great Britain | Nov. 24, 1891 |
| 1,036,232 | France | Apr. 22, 1953 |